United States Patent [19]
Klemantaski

[11] Patent Number: 5,967,084
[45] Date of Patent: Oct. 19, 1999

[54] APPARATUS FOR CONTROLLING MOVEMENTS OF MOLLUSCA AND THE LIKE

[75] Inventor: Sidney Klemantaski, 23 South Eden Park Road, Beckenham, Kent, United Kingdom, BR3 3BQ

[73] Assignees: Sidney Klemantaski, Beckenham; Edwin C. Hernicht, Purley; Trevor J. Jones, Warford Herts, all of United Kingdom

[21] Appl. No.: 09/091,322

[22] PCT Filed: Dec. 13, 1996

[86] PCT No.: PCT/GB96/03091

§ 371 Date: Dec. 4, 1998

§ 102(e) Date: Dec. 4, 1998

[87] PCT Pub. No.: WO97/22241

PCT Pub. Date: Jun. 26, 1997

[30] Foreign Application Priority Data

Dec. 15, 1995 [GB] United Kingdom ............... 9525740

[51] Int. Cl.[6] .................................................. A01K 7/00
[52] U.S. Cl. .................................................. 119/61; 43/112
[58] Field of Search ........................... 119/51.5, 61, 416; 43/98, 107, 108, 112

[56] References Cited

U.S. PATENT DOCUMENTS

| 4,098,018 | 7/1978 | Bartelme | 43/108 |
| 4,165,577 | 8/1979 | Shanahan | |
| 4,186,512 | 2/1980 | Berg | 43/98 |
| 4,392,721 | 7/1983 | Plöbst | |
| 4,471,561 | 9/1984 | Lapierre | 43/108 |
| 4,747,229 | 5/1988 | Chambers | 43/112 |
| 4,756,116 | 7/1988 | Cutter | 43/108 |
| 4,827,874 | 5/1989 | Mahan | 119/61 |

FOREIGN PATENT DOCUMENTS

| 554 935 | 9/1986 | Australia |
| 392 721 | 5/1991 | Austria |
| 256 787 | 3/1949 | Switzerland |
| 432 928 | 9/1967 | Switzerland |
| 519 293 | 8/1972 | Switzerland |
| WO 88 03754 | 6/1988 | WIPO |

*Primary Examiner*—Thomas Price
*Attorney, Agent, or Firm*—Kinney & Lange, P.A.

[57] ABSTRACT

An apparatus for controlling the movement of snails or slugs having a non-conductive carrier comprising an upstanding wall surface formed with an outwardly projecting step, a first elongate conductor mounted on the carrier with its uppermost longitudinal edge generally level with the lower margin of the step and a second elongate conductor mounted on the carrier with its lowermost longitudinal edge either adjacent the lower edge of the step or overlapping that edge. A low voltage source is connected to each elongated conductor.

9 Claims, 2 Drawing Sheets

APPARATUS FOR CONTROLLING MOVEMENTS OF MOLLUSCA AND THE LIKE

This invention relates to apparatus capable of controlling the movement of mollusca including snails and slugs and other plant eating species which possess abdominal locomotor appendages. For the sake of simplicity, these will hereinafter be referred to as snails or slugs. More especially, but not exclusively, the invention relates to apparatus for denying snails and slugs access to protected crops and plants. The invention also has application to apparatus for confining snails (particularly edible snails) within a predetermined area.

It is of course well known that plants and vegetation can be devastated by snails and slugs. Slugs and snails also leave unsightly trails on garden paths or terraces as they move across the same. They are, therefore, generally deemed to be a nuisance to gardeners. Many well documented devices and traps are employed by gardeners to protect their plants and vegetables from these pests. These devices include poisonous pellets which not only destroy slugs which consume the same but also birds and domestic and wild animals which consume either the pellets or slugs contaminated thereby. Other known devices include traps comprising beakers filled with beer which are set in the ground to which slugs are attracted and into which they fall. All of these known devices are intended to destroy, often painfully, snails and slugs which come in contact with them.

It has also been proposed to deploy electrically powered conductor-carrying strips around a protected area. Thus, U.S. Pat. No. 4,747,229 discloses a strip which comprises an elongate base of dielectric insulating material on which are mounted a plurality of conductor wires connected to the terminals of a 9 volt battery. Such strips are intended to destroy pests which come into contact with them and are effective for only limited periods of time. This is because the slime trail left by slugs and snails in time provides a bridge between the conductors thereby causing the battery to drain. This bridging effect is enhanced by the presence of water, dirt and other debris. Also, snails and slugs destroyed by the electrical current themselves provide bridges causing electrical current to flow when not required and also bridges for snails and slugs seeking to enter the protected area at a laser time.

U.S. Pat. No. 4,827,874 is directed to an electrified feeding dish which includes a pair of strip conductors positioned around the dish circumference and connected to a battery contained within the dish. The same problems discussed above regarding bridging these conductors would occur with the dish of U.S. Pat. No. 4,827,874.

AT-B-392721 discloses a device which comprises an electrically conductive carrier which supports an electrically conductive strip spaced from the carrier by a plastic tape, washers and plastic rivets.

CH-A-256787 discloses a similar device which includes an upstanding non-conductive carrier being two parallel elongate electrical conductors spaced one above the other.

The present invention sets out to provide apparatus for controlling movement of snails and slugs which overcomes, or at least alleviates, the problems discussed above and which harms neither snails or slugs which come into contact with it or birds and wild or domestic animals which may also come into contact with the apparatus or consume snails or slugs whose movements have been restricted by the apparatus.

According to the present invention in one aspect, there is provided apparatus for controlling the movement of snails or slugs which comprises a non-conductive carrier formed with an outwardly projecting step, a first elongate conductor mounted on the carrier with its uppermost longitudinal edge generally level with the lower margin of the step, a second elongate conductor mounted on the carrier with its lowermost longitudinal edge either adjacent the lower edge of the step or overlapping that edge, and a low voltage source whose terminals are connected one to each elongate conductor, the spacing between the two conductors being between 0.5 mm and 5 mm and the spacing between the first and second conductors is defined at least in part by an air gap.

The spacing between the planes containing the first and second conductors is preferably between 2 mm and 4 mm; typically it is 3 mm.

In one arrangement, the low voltage source comprises a 9 volt direct current battery; in another arrangement the low voltage source comprises a 4.5 volt direct current battery. Any low voltage source may, however, be employed.

The elongate conductors may be of the same or different material. Thus, each conductor may be essentially of copper; alternatively, one conductor may be essentially of copper and the other essentially of zinc. In the latter arrangement, the copper conductor is connected to the negative terminal of the low voltage source with the zinc conductor connected to the positive terminal.

Each conductor may comprise an electrically conductive coating, wire or foil mounted on a non-conducting carrier, the carrier supporting one or both conductors. Each conductor may be positioned in a shallow groove set in the surface of its carrier with the upper surface of each conducting standing proud of the surface of the carrier on which it is mounted.

The surface of the carrier in which the conductors are positioned may be upstanding or generally horizontal. In the former case, the conductors project outwardly from the carrier surface; in the latter case, the conductors project upwardly from the carrier surface.

In one arrangement the carrier comprises an upstanding wall surface of a container such as a plant pot or plant pot stand. In this arrangement, the low voltage source comprises a DC battery housed within the pot or stand the side wall of the pot or stand is formed with an outwardly projecting peripheral step. One conductor extends around the pot or stand with its uppermost longitudinal edge generally level with the lower edge of the step, and the other conductor extends around the step stand with its lowermost longitudinal edge either adjacent the lower edge of the step or overlapping that edge. The required air gap between the neighbouring longitudinal edges of the conductors is formed by shaping the pot or stand surface which joins the step to the pot or stand side wall to define an upwardly extending return.

The invention will now be described by way of example only with reference to the accompanying diagrammatic drawings, in which.

Figure 1:
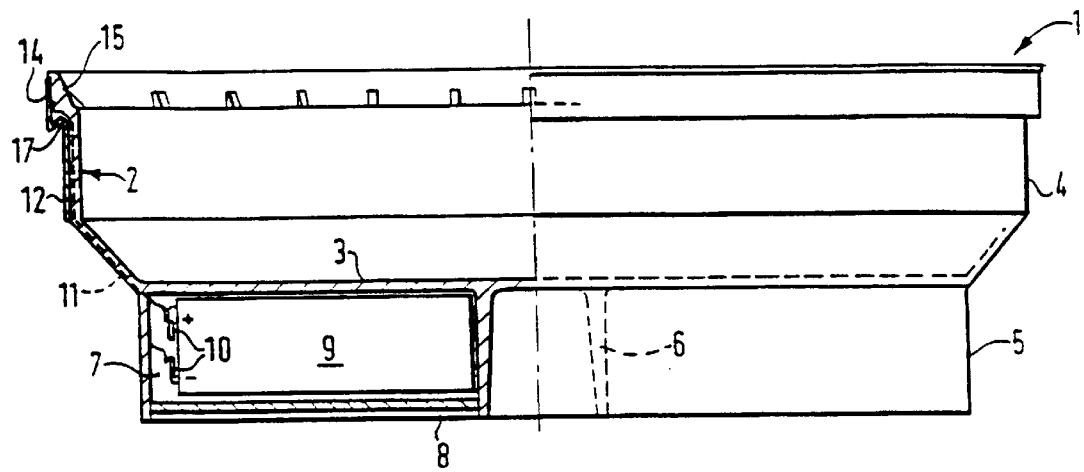
FIG. 1 is a side view partly in section of apparatus in accordance with the invention in the form of a stand on a flower pot.
Figure 2:
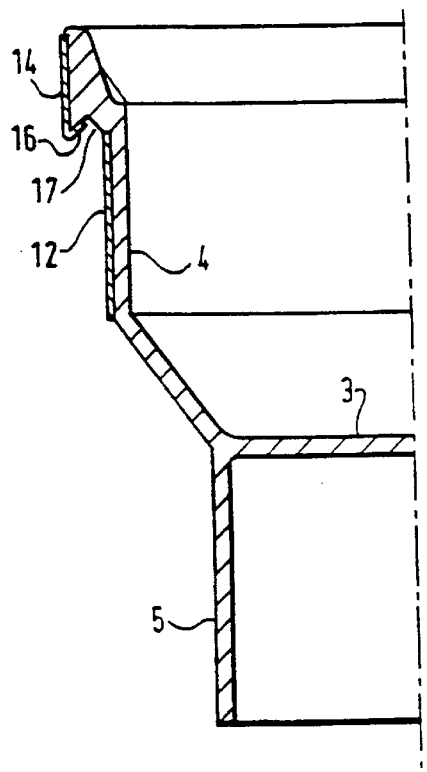
FIG. 2 is a section to an enlarged scale of one side wall of the stand illustrated in FIG. 1.
Figure 3:
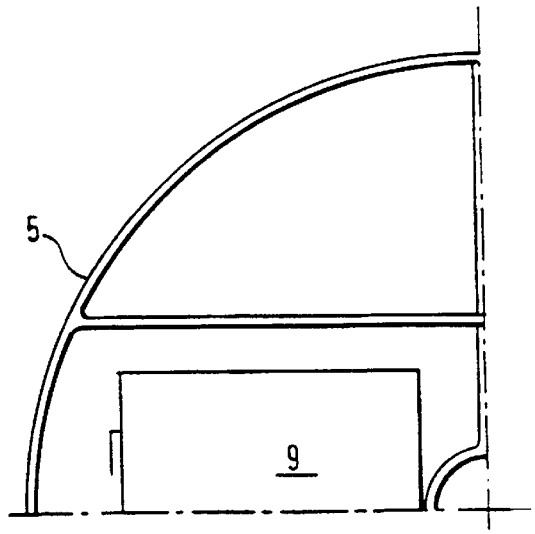
FIG. 3 is a plan view from below of a part of the stand illustrated in FIGS. 1 and 2.

The apparatus illustrated in FIGS. 1 to 3 comprises a generally circular stand 1 for supporting a plant pot (not shown). The stand comprises a tray 2 having a floor 3 and an upstanding wall 4 supported on a base 5 which includes a central support 6. The base 5 houses a compartment 7 closed from below by a cover plate 8 which houses a 4.5 volt direct current battery 9. The positive and negative terminals of the battery are connected to spade connectors 10 of wires 11 which are in turn connected to annular conductors 12, 14. As shown the conductors 12, 14 take the form of copper strips which pass around the entire circumference of the wall 4 of the tray 2. Typically the upper conductor 12 is between 10 mm and 15 mm in width and the lower conductor 14 is between 17 mm and 22 mm in width. Other forms of conductors may be employed, these including metallised coatings, electrically conductive wires, or foil strip.

As will be seen from FIGS. 1 and 2, the wall 4 is formed with an outwardly projecting annular step 15 to which the upper conductor 14 is secured with its lower most longitudinal edge extending over the lower edge of the step 15 and into an upwardly extending return 16 of the tray surface disposed between the step 15 and the wall 4 of the tray 2. The lower conductor 12 is secured to the wall 4 with its upper longitudinal edge generally at the same level neat the lower longitudinal edge of the upper conductor 14. The return 16 defines an air gap 17 between the conductors 12, 14.

The wall 4 is shown as being generally vertical. It may, however, alternatively be inclined. In a preferred arrangement the wall inclines outwardly from the floor 3.

As a snail or slug climbs the wall 4 it makes contact with the lowermost conductor 12. Many snails or slugs are deterred by copper and the width of the conductor 12 takes this into account. If nevertheless the snail or slug continues up the wall 4 it is confronted by the step 15. As soon as it contacts the upper conductor 14 the gap between the conductors 12, 14 is bridged thereby completing the circuit to cause current to flow. A low amperage shock is thereby imparted to the snail or slug to cause it to move away from the upper conductor 14. The air gap 17 ensures that if any slime is left by the snail or slug which bridges the gap between the conductors, it quickly dissipates to open the circuit thereby prolonging the life of the battery 9.

Figure 4:
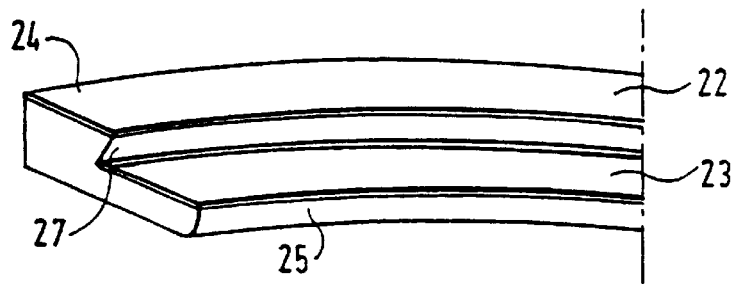
FIGS. 4 and 5 are perspective and sectional views of further apparatus in accordance with the invention.
Figure 5:
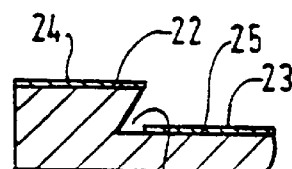

The apparatus illustrated in FIGS. 4 and 5 comprises a 4.5 or 9-volt direct current battery whose positive and negative terminals are connected to galvanised steel conductors 22, 23 supported on upper and lower tiered non-conducting surfaces 24, 25 of an elongate carrier in the form of a strip which can be laid on a surface to prevent snails or slugs entering the area bordered by the carrier strip. The surface may be, for example, a patio surface or open ground. In the latter case, pegs may be employed to secure the carrier strip in place. As for the stand described above, an air gap 27 is defined between the carrier tiers 24, 25 by providing a return in the material of the carrier. The electrical circuit including the battery and the conductors is completed by a slug or snail simultaneously making contact with both conductors. When this happens the slug receives a mild electrical shock causing it to withdraw rapidly from the carrier. The slug is not harmed by the electric shock received but is unlikely to continue its slow movement over the carrier to a vegetable or plant positioned within the boundary defined by the carrier. The air gap 27 ensures that any slime trail left behind by a retreating snail or slug quickly dissipates so breaking the circuit and prolonging the life of the battery 21. Also, the fact that the outer edges of the conductor 22 and the carrier tier 24 coincide, prevents slugs or snails arching over the conductors.

The conductors are spaced apart by a distance no greater than the width of a typical snail or slug; typically this spacing is between 0.5 mm and 5 mm. Where the apparatus is used for grading edible snails by size, the spacing between different conductors or discrete conductor lengths may vary.

Figure 6:
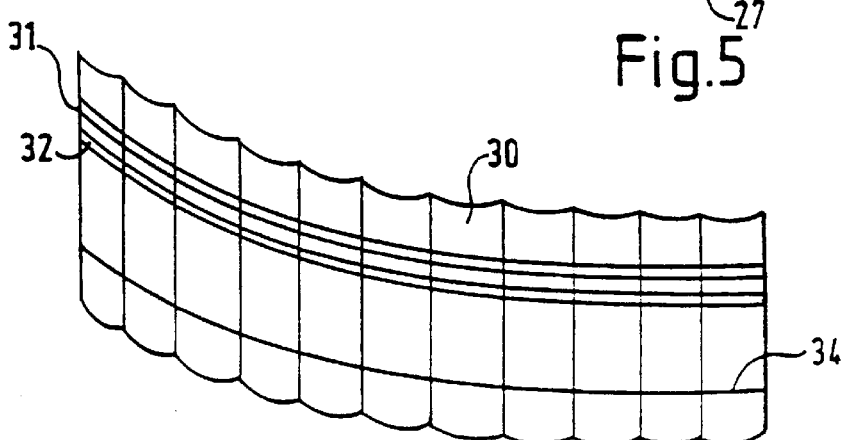
FIGS. 6 and 7 are perspective and side views of still further apparatus in accordance with the invention.
Figure 7:
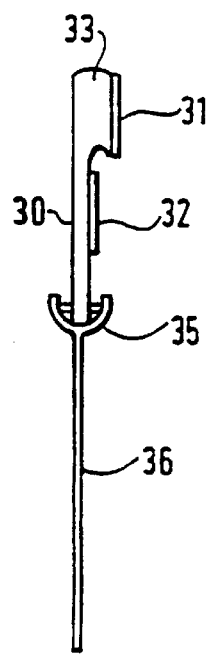

The apparatus illustrated in FIGS. 6 and 7 comprises a corrugated border strip 30 designed to be mounted generally vertically around an area of land to be protected from snails and slugs. The border strip 30 has secured to its surface longitudinally extending generally parallel upper and lower electrical conductors 31, 32 respectively connected to a 4.5 or 9 volt DC battery (not shown). The conductors 31, 32 comprise metallised coatings, strips of foil or copper, zinc or like conductive material, the upper conductor 32 being carried on an outwardly protruding step 33 and the lower conductor being carried on a surface of the strip 30 immediately below and to one side of the lower edge of the step 33. An air gap is formed between the neighboring longitudinal edges of the conductors 31, 32.

A white or coloured line 34 is provided to indicate to the user the height of border strip to be exposed above the surrounding ground or foliage.

The border strip 30 may be pushed into the ground or, as shown in FIG. 7, the border strip 30 may be supported within a channel shaped support 35 carried by a rigid or semi rigid skirt 36. The depth of the skirt 36 is selected to prevent slugs or snails passing below it and into the protected area.

Figure 8:
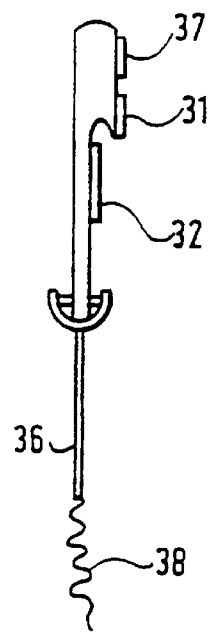
FIG. 8 is a side view of yet further apparatus in accordance with the invention.

As shown in FIG. 8, the skirt 36 may include a flexible plastics skirt 37 to act as a further barrier to burrowing snails or slugs. In this embodiment a third conductor 38 of the same polarity as the lower conductor 31 is positioned along the upper margin of the border strip 30 to prevent large snails or slugs passing over the top of the strip 30. The support 35 may be filled with sand or other material to prevent the passage of snails or slugs. Several strips 30, 36, 38 may be connected end to end to produce a continuous barrier of the required length.

The border strip operates in the same manner as the stand described above with reference to FIGS. 1 to 3.

In an unillustrated embodiment, two low voltage sources are provided, one acting as a standby source and the other as an additional source. A solenoid switches between a first position in which the conductors are connected only to the standby source and a second position in which they are connected to both sources when a snail touches both conductors. The standby source emits a current less than the solenoid activation current. As a slug passes over the exposed conductors in one direction the solenoid operates to bring both circuits into operation thereby causing the slug to be subjected to an electric shock. By this means, current drain can be reduced, especially if a device to return the system to a standby position after a suitable time is provided and directional control of slugs or snails seeking to pass over the carriers and conductors can be achieved. Such a device may include a relay operated, perhaps after a short delay, by the shock current. With a three-conductor system in which the first and second conductors (in the undesired direction of snail movement) are connected to the standby source, a slug making contact with these conductors causes a solenoid to connect the second and third conductors to the shock low voltage source (typically 4.5 or 9 volts) so imposing a directional control of slugs or snails moving in the opposite "desired" direction will have largely passed over the shock conductors by the time the 9 Volt source is connected by their presence. Another possible arrangement comprises four conductors, two being connected to the standby source and switching on the 9 V source when a slug touches them.

In another unillustrated embodiment, the standby source comes into operation when a snail or slug makes simultaneous contact with two conductors of dissimilar metals, such as copper and zinc, to produce a voltage therebetween.

The apparatus described can be linked into any extent low-voltage garden lighting system. The apparatus can also be used to advantage when seeking to protect greenhouses from slugs and snails. Additionally, the apparatus could be employed to protect entire gardens from invasion by slugs and snails by mounting conductors, for example, on a shelf including suitably positioned drain holes on or at the front of a boundary fence or wall.

It will be appreciated that the foregoing is merely exemplary of apparatus in accordance with the invention and that modifications can readily be made thereto without departing from the true scope of the invention.

I claim:

1. Apparatus for controlling the movement of snails or slugs which comprises a non-conductive carrier comprising an upstanding wall surface of a container and formed with an outwardly projecting step, a first elongate conductor mounted on the carrier with its uppermost longitudinal edge generally level with the lower margin of the step, a second elongate conductor mounted on the carrier with its lowermost longitudinal edge either adjacent the lower edge of the step or overlapping that edge, and a low voltage source whose terminals are connected one to each elongate conductor, the spacing between the two conductors being between 0.5 mm and 5 mm and the spacing between the first and second conductors being defined at least in part by an air gap, which air gap is formed by shaping the wall surface of the container which join the step to the container side wall to define an upwardly extending return.

2. Apparatus as claimed in claim 1 wherein the spacing between the first and second conductors is between 2 mm and 4 mm.

3. Apparatus as claimed in claim 2 wherein the spacing between the first and second conductors is 3 mm.

4. Apparatus as claimed in claim 1 wherein the low voltage source comprises a direct current battery.

5. Apparatus as claimed in claim 4 wherein the low voltage source comprises a 4.5 volt direct current battery.

6. Apparatus as claimed in claim 1 wherein each conductor is essentially of copper.

7. Apparatus as claimed in claim 1 wherein one conductor is essentially of copper and the other conductor is essentially of zinc.

8. Apparatus as claimed in claim 7 wherein the copper conductor is connected to the negative terminal of the low voltage source with the zinc conductor connected to the positive terminal.

9. Apparatus as claimed in claim 1 wherein each conductor comprises an electrically conductive coating, wire or foil mounted on the carrier.

\* \* \* \* \*